US010138026B2

(12) United States Patent
Branyon

(10) Patent No.: US 10,138,026 B2
(45) Date of Patent: Nov. 27, 2018

(54) RESEALABLE FLEXIBLE PACKAGE AND METHOD OF USING THE SAME

(71) Applicant: Sonoco Development, Inc., Hartsville, SC (US)

(72) Inventor: Jacob Donald Prue Branyon, Hartsville, SC (US)

(73) Assignee: SONOCO DEVELOPMENT, INC., Hartsville, SC (US)

(*) Notice: Subject to any disclaimer, the term of this patent is extended or adjusted under 35 U.S.C. 154(b) by 361 days.

(21) Appl. No.: 14/676,390

(22) Filed: Apr. 1, 2015

(65) Prior Publication Data
US 2016/0288960 A1 Oct. 6, 2016

(51) Int. Cl.
| | |
|---|---|
| B65D 33/30 | (2006.01) |
| B65D 33/20 | (2006.01) |
| B65D 77/14 | (2006.01) |
| B32B 37/12 | (2006.01) |
| B32B 38/10 | (2006.01) |

(52) U.S. Cl.
CPC .............. *B65D 33/20* (2013.01); *B32B 37/12* (2013.01); *B32B 38/10* (2013.01); *B65D 77/14* (2013.01); *B32B 2439/00* (2013.01); *B65D 2575/586* (2013.01)

(58) Field of Classification Search
CPC ... B65D 33/20; B65D 77/14; B65D 2575/586
USPC ............... 383/62, 82, 83, 85, 88, 89, 90, 91; 428/40.1, 41.7
See application file for complete search history.

(56) References Cited

U.S. PATENT DOCUMENTS

| | | | |
|---|---|---|---|
| 1,827,636 A | 10/1931 | Ames | |
| 2,131,575 A * | 9/1938 | Whipple | ................ B65D 27/16 229/80 |

(Continued)

FOREIGN PATENT DOCUMENTS

| | | |
|---|---|---|
| CN | 1558827 | 12/2004 |
| DE | 8903067 | 7/1989 |

(Continued)

OTHER PUBLICATIONS

LPS Industries, Loc n Press Pressure Sensitive Zippered Envelopes, www.ipsind.com, accessed Apr. 1, 2015.

(Continued)

*Primary Examiner* — Jes F Pascua
(74) *Attorney, Agent, or Firm* — Nelson Mullins Riley & Scarborough LLP

(57) ABSTRACT

A flexible package that includes a flexible material in the form of a first panel and a second panel. The first panel includes a first perimeter that is attached to a second perimeter, associated with the second panel, to form an interior cavity, between the first panel and second panel, in which content is stored. The package also includes an adhesive that is attached to a first exterior surface of the first panel or a second exterior surface of the second panel. The adhesive has a first state that prevents the adhesive from bonding with the flexible material that does not permit the package, once opened, to be reclosed. The adhesive may have a second state that can be activated to enable the adhesive to bond with the flexible material that permits the package, once opened, to be reclosed or resealed.

8 Claims, 15 Drawing Sheets

(56) References Cited

U.S. PATENT DOCUMENTS

| | | | |
|---|---|---|---|
| 2,861,735 A * | 11/1958 | Faltin | B65D 33/14 206/806 |
| 2,952,395 A | 9/1960 | Spees | |
| 2,991,001 A * | 7/1961 | Hughes | B65D 33/20 383/210.1 |
| 3,127,087 A | 3/1964 | Spees | |
| 3,239,097 A | 3/1966 | Bates et al. | |
| 3,259,303 A | 7/1966 | Repko | |
| 3,266,965 A | 8/1966 | Spees | |
| 3,279,331 A * | 10/1966 | Platt | B65D 33/18 383/120 |
| 3,335,939 A | 8/1967 | Robinson, Jr. | |
| 3,942,640 A | 3/1976 | Hellstrom | |
| 3,946,872 A | 3/1976 | Sturm | |
| 4,023,292 A * | 5/1977 | Shibata | B42F 5/00 40/773 |
| 4,066,600 A * | 1/1978 | Pletcher | C08G 63/16 156/332 |
| 4,185,754 A | 1/1980 | Julius | |
| 4,264,662 A * | 4/1981 | Taylor | C09J 7/02 229/200 |
| 4,280,653 A | 7/1981 | Elias | |
| 4,345,393 A | 8/1982 | Price et al. | |
| 4,353,460 A | 10/1982 | Kahn | |
| 4,372,460 A | 2/1983 | Brochman et al. | |
| 4,381,848 A | 5/1983 | Kahn | |
| 4,452,842 A | 6/1984 | Borges et al. | |
| 4,464,158 A * | 8/1984 | Kardon | B31B 70/00 229/80 |
| 4,502,599 A | 3/1985 | Perecman | |
| 4,531,668 A | 7/1985 | Forbes, Jr. | |
| 4,574,952 A | 3/1986 | Masui | |
| 4,584,201 A * | 4/1986 | Boston | B65D 33/1691 383/210.1 |
| 4,679,693 A | 7/1987 | Forman | |
| 4,738,365 A | 4/1988 | Prater | |
| 4,785,940 A * | 11/1988 | Wilson | B65D 33/20 383/204 |
| 4,838,429 A | 6/1989 | Fabisiewicz et al. | |
| 4,846,504 A | 7/1989 | MacGregor et al. | |
| 4,871,265 A * | 10/1989 | Peck | B65D 33/20 229/80 |
| 4,913,560 A * | 4/1990 | Herrington | B65D 33/165 206/813 |
| 5,044,776 A | 9/1991 | Schramer et al. | |
| 5,123,535 A * | 6/1992 | Patnode | B65D 33/20 206/438 |
| 5,265,794 A | 11/1993 | Johnston | |
| 5,415,910 A | 5/1995 | Knauf | |
| 5,484,167 A | 1/1996 | Donaldson et al. | |
| 5,507,428 A | 4/1996 | Robinson, Jr. et al. | |
| 5,569,515 A * | 10/1996 | Rice, II | B31D 1/02 156/153 |
| 5,571,358 A | 11/1996 | Napier et al. | |
| 5,832,145 A | 11/1998 | Dais et al. | |
| 5,833,368 A | 11/1998 | Kaufman | |
| 5,855,435 A * | 1/1999 | Chiesa | B65D 75/5838 383/204 |
| 5,871,096 A | 2/1999 | Yakich | |
| 5,902,045 A * | 5/1999 | Resteghini | B65D 33/14 383/204 |
| 5,910,348 A * | 6/1999 | Hart-Smith | B32B 27/12 428/354 |
| 5,947,368 A | 9/1999 | Thresher et al. | |
| 5,958,486 A | 9/1999 | Ringdahl et al. | |
| 5,979,748 A | 11/1999 | Drummond et al. | |
| 6,041,929 A | 3/2000 | Brunner et al. | |
| 6,047,488 A | 4/2000 | Tuskiewicz | |
| 6,056,141 A | 5/2000 | Navarini et al. | |
| 6,190,485 B1 | 2/2001 | Cahill et al. | |
| 6,196,450 B1 | 3/2001 | Varadarajan et al. | |
| 6,206,570 B1 | 3/2001 | Cortopassi | |
| 6,234,386 B1 | 5/2001 | Drummond et al. | |
| 6,264,098 B1 | 7/2001 | Drummond et al. | |
| 6,270,004 B1 | 8/2001 | Drummond et al. | |
| 6,302,321 B1 | 10/2001 | Reese et al. | |
| 6,328,203 B1 | 12/2001 | Tedford, Jr. | |
| 6,334,711 B1 | 1/2002 | Risgalla et al. | |
| 6,383,592 B1 | 5/2002 | Lowry et al. | |
| 6,428,867 B1 | 8/2002 | Scott et al. | |
| 6,460,720 B1 | 10/2002 | Massey et al. | |
| 6,497,336 B2 | 12/2002 | Grayer | |
| 6,544,613 B1 | 4/2003 | Varadarajan | |
| 6,589,622 B1 | 7/2003 | Scott | |
| 6,620,275 B1 | 9/2003 | Avila et al. | |
| 6,660,353 B2 | 12/2003 | Siedl | |
| 6,746,743 B2 | 1/2004 | Knoerzer et al. | |
| 6,857,561 B2 | 2/2005 | Williams et al. | |
| 6,858,108 B2 | 2/2005 | Matthews et al. | |
| 6,890,112 B2 | 5/2005 | Kline | |
| 6,991,375 B2 | 1/2006 | Clune et al. | |
| 7,144,635 B2 | 12/2006 | Hawes et al. | |
| 7,189,300 B2 | 3/2007 | Knoerzer et al. | |
| 7,228,961 B2 | 6/2007 | Koetter et al. | |
| 7,344,744 B2 | 3/2008 | Sierra-Gomez et al. | |
| 7,416,768 B2 | 8/2008 | Knoerzer et al. | |
| 7,422,782 B2 | 9/2008 | Haedt et al. | |
| 7,608,317 B2 | 10/2009 | Keckeisen et al. | |
| 7,686,513 B2 | 3/2010 | Knoerzer et al. | |
| 7,717,620 B2 | 5/2010 | Hebert et al. | |
| 7,789,236 B2 | 9/2010 | Burgess | |
| 7,828,923 B2 * | 11/2010 | Patel | C09J 7/0207 156/238 |
| 7,955,678 B2 * | 6/2011 | Stogbauer | C09J 7/0203 156/153 |
| 8,051,979 B2 | 11/2011 | Smith et al. | |
| 8,408,451 B2 | 4/2013 | Adam et al. | |
| 8,443,578 B2 | 5/2013 | Sargin et al. | |
| 8,544,718 B2 | 10/2013 | Yamato et al. | |
| 8,646,975 B2 | 2/2014 | Moehlenbrock et al. | |
| 8,740,052 B2 | 6/2014 | Drummond | |
| 8,746,490 B2 | 6/2014 | Huffer et al. | |
| 9,096,346 B2 | 8/2015 | Huffer | |
| 9,278,506 B2 | 3/2016 | McLean | |
| 2003/0178429 A1 | 9/2003 | Williams et al. | |
| 2004/0013827 A1 | 1/2004 | Zuser et al. | |
| 2004/0064983 A1 | 4/2004 | Joseph | |
| 2004/0079763 A1 | 4/2004 | Powell et al. | |
| 2005/0031814 A1 | 2/2005 | Dawes | |
| 2005/0078890 A1 | 4/2005 | Abe et al. | |
| 2005/0109652 A1 | 5/2005 | Goepfert | |
| 2005/0153113 A1 | 7/2005 | Hseih et al. | |
| 2005/0276525 A1 | 12/2005 | Hebert et al. | |
| 2006/0138207 A1 | 6/2006 | Levine et al. | |
| 2006/0147129 A1 | 7/2006 | Miller | |
| 2006/0198986 A1 | 9/2006 | Keckeisen et al. | |
| 2007/0051790 A1 | 3/2007 | Smith et al. | |
| 2008/0037911 A1 | 2/2008 | Cole et al. | |
| 2008/0044114 A1 | 2/2008 | Hall et al. | |
| 2008/0240627 A1 | 10/2008 | Cole et al. | |
| 2008/0272016 A1 | 11/2008 | Anderson et al. | |
| 2009/0194451 A1 | 8/2009 | Leiner et al. | |
| 2009/0226117 A1 | 9/2009 | Davis et al. | |
| 2009/0274799 A1 | 11/2009 | Lee et al. | |
| 2010/0098355 A1 | 4/2010 | Jansen | |
| 2010/0111453 A1 | 5/2010 | Dierl | |
| 2010/0147724 A1 | 6/2010 | Mitra-Shah et al. | |
| 2010/0288760 A1 * | 11/2010 | McGrew | B65D 5/4275 220/23.83 |
| 2011/0038569 A1 * | 2/2011 | Huffer | B65D 33/20 383/207 |
| 2011/0049168 A1 | 3/2011 | Loftin | |
| 2011/0089177 A1 | 4/2011 | Thorstensen-Wolf | |
| 2011/0204056 A1 | 8/2011 | Veternik et al. | |
| 2012/0082764 A1 | 4/2012 | Paterson | |
| 2012/0125932 A1 | 5/2012 | Sierra-Gomez et al. | |
| 2012/0177307 A1 | 7/2012 | Duan et al. | |
| 2012/0314979 A1 | 12/2012 | Heininga | |
| 2013/0026170 A1 * | 1/2013 | Zerfas | B65D 75/44 220/315 |
| 2013/0089280 A1 | 4/2013 | Tseng et al. | |
| 2013/0101239 A1 | 4/2013 | Kropf et al. | |

(56) References Cited

U.S. PATENT DOCUMENTS

| | | |
|---|---|---|
| 2013/0114918 A1 | 5/2013 | Lyzenga et al. |
| 2013/0121624 A1 | 5/2013 | Lyzenga et al. |
| 2013/0279832 A1 | 10/2013 | Burri et al. |
| 2013/0320019 A1 | 12/2013 | Tinoco et al. |
| 2014/0000219 A1 | 1/2014 | Pezzoli |
| 2014/0079343 A1 | 3/2014 | Lyzenga et al. |
| 2014/0270597 A1 | 9/2014 | Friedman et al. |
| 2014/0363545 A1 | 12/2014 | Veternik et al. |
| 2014/0376836 A1 | 12/2014 | Schieber |
| 2015/0158643 A1 | 6/2015 | Coker et al. |
| 2015/0297005 A1 | 10/2015 | Janor |
| 2015/0353238 A1 | 12/2015 | Moehlenbrock et al. |
| 2016/0009447 A1 | 1/2016 | Rhue |
| 2016/0096667 A1 | 4/2016 | Huffer |
| 2016/0130041 A1 | 5/2016 | Giorgio et al. |
| 2016/0167680 A1 | 7/2016 | Tomsovic et al. |
| 2016/0227835 A1 | 8/2016 | Swede |
| 2016/0236844 A1 | 8/2016 | Gagne et al. |
| 2016/0343275 A1 | 11/2016 | Huffer et al. |
| 2017/0121086 A1 | 5/2017 | Hartley |
| 2017/0121088 A1 | 5/2017 | Rhue |
| 2017/0283149 A1 | 10/2017 | Rhue |

FOREIGN PATENT DOCUMENTS

| | | |
|---|---|---|
| EP | 0 488 967 A1 | 6/1992 |
| EP | 0499647 B1 | 1/1995 |
| EP | 0952087 A2 | 10/1999 |
| EP | 1080874 | 3/2001 |
| EP | 1477408 A1 | 11/2004 |
| EP | 1770025 A2 | 4/2009 |
| FR | 1514374 A | 2/1968 |
| GB | 2147564 A | 5/1985 |
| GB | 2491646 A | 12/2012 |
| WO | WO 95/29097 A1 | 11/1995 |
| WO | WO 96/25333 A1 | 8/1996 |
| WO | WO 98/28728 A1 | 7/1998 |
| WO | WO 2008/086389 A2 | 7/2008 |
| WO | WO 2012/036765 | 3/2012 |
| WO | WO 2012/036765 A1 | 3/2012 |
| WO | WO 2014/186571 A2 | 11/2014 |

OTHER PUBLICATIONS

Clearbags, Value Crystal Clear Bags, www.clearbags.conn, accessed Apr. 1, 2015.

ITC, Custom Adhesive Tape Manufacturing & Design, www.itctapes.com, accessed Feb. 2, 2015.

"Tamper-evidence: Consumers have come to expect tamper-evidence for drugs, foods"; Packaging (Boston, Mass); Mar. 19, 1989; vol. 34, No. 5 (3 pgs.).

"Innovations for opening and closing"; Food Trade Review; Oct. 1993; vol. 63, No. 4 (3 pgs.).

Kate Bertrand; "Improve security through packaging: emerging technologies can help create a package that safeguards products from tampering and protects your brand from counterfeiting"; Food Processing; Feb. 2006; vol. 67, No. 2 (5 pgs.).

U.S. Appl. No. 15/442,779, entitled "Resealable Flexible Packaging", filed Feb. 27, 2017.

U.S. Appl. No. 15/656,481, entitled "Tamper Evident Hybrid Resealable Container", filed Jul. 21, 2017.

U.S. Appl. No. 15/807,200, entitled "Membrane Lid With Integrated Peelable Portion", filed Nov. 8, 2017.

U.S. Appl. No. 15/676,167, entitled "Flexible Laminate for Packaging with Integrated Peelable Portion", filed Aug. 14, 2017.

Final Office Action for U.S. Appl. No. 14/928,489 dated Mar. 22, 2018.

International Search Report and Written Opinion of the International Searching Authority for International Application No. PCT/US2017/064594 dated Mar. 27, 2018.

Non-final Office Action for U.S. Appl. No. 14/871,398 dated May 2, 2018.

Extended European Search Report for European Patent Application No. 18174601.7 dated Jul. 26, 2018. All enclosed pages cited.

* cited by examiner

RESEALABLE FLEXIBLE PACKAGE AND METHOD OF USING THE SAME

BACKGROUND

Today's conventional flexible packaging is usually used to protect, store, ship, display and/or sell certain low cost perishable goods such as food (e.g., dry snacks, cereals, certain vegetables, etc.). Such conventional flexible packaging is usually formed by a single layer, single-ply, or mono-web material. Once opened by the consumer, such conventional packaging cannot be reclosed. Thus, to prevent premature spoilage or waste of the goods remaining in the package, the consumer must improvise by, for example, rolling the open end of the conventional flexible package onto itself to create a partial seal that provides some protection for the goods remaining within. Unfortunately, the rolled portion of the conventional package often gradually becomes undone (e.g., unrolled), which can cause the goods to be damaged, spoil, become stale, etc.

Some types of conventional flexible packaging are formed by a multiple layer, multi-ply, or multi-web material and include mechanical mechanisms, such as zip locks or slide locks, to reseal the conventional flexible package. Such multi-ply materials and mechanical reseal mechanisms are typically used in higher cost conventional flexible packaging for higher cost perishable goods (e.g., cookies, nuts, cold cuts, cheese, freezable items, etc.). Similarly, such multi-ply conventional flexible packaging sometimes includes a non-mechanical reseal mechanism that uses a temporary adhesive on an inside surface of the conventional package, instead of or in addition to the mechanical reseal mechanism, that enables the multi-ply conventional flexible package to be resealed after opening. Such reseal mechanisms usually include tearing-off and/or discarding a portion of the conventional package (e.g., often in the form of litter) to enable the conventional package to be resealed, which can harm the environment. The higher resale price of such perishable goods can usually tolerate the added expense of higher cost multi-ply conventional flexible packaging that includes the mechanical reseal or non-mechanical reseal mechanisms. However, multi-ply conventional flexible packaging, that includes the mechanical reseal or non-mechanical reseal mechanisms, are usually cost prohibitive for use in packaging lower cost goods that use single-ply conventional flexible packaging.

SUMMARY

According to an implementation, described here, a flexible package may include a first panel and a second panel that are formed by a flexible material. The first panel may be attached to the second panel to form an interior cavity, between the first panel and second panel, in which content is stored. The flexible package may also include an adhesive that is attached to a first exterior surface of the first panel, or a second exterior surface of the second panel. The adhesive may have a first state and a second state. The first state may preclude the adhesive from bonding with the flexible material to prevent the package, once opened, from being reclosed or resealed by the adhesive in the first state. The second state, when activated, may enable the adhesive to bond with the flexible material to permit the package, once opened, to be reclosed or resealed by the adhesive in the second state.

According to another implementation, a resealable flexible package may include a first panel and a second panel that are formed by a flexible material. The first panel may be attached to the second panel to form an interior cavity, between the first panel and second panel, in which content is stored. A pressure sensitive adhesive may be attached to a first surface of the first panel or a second surface of the second panel. The pressure sensitive adhesive may have a first state and a second state. The first state may preclude the pressure sensitive adhesive from bonding with the flexible material to prevent the resealable flexible package, once opened, from being reclosed or resealed by the pressure sensitive adhesive in the first state. The second state, when activated, may enable the pressure sensitive adhesive to bond with the flexible material to permit the resealable flexible package, once opened, to be reclosed or resealed by the pressure sensitive adhesive in the second state.

According to a further implementation, a method of resealing a flexible package may include opening the flexible package to access content stored within the flexible package. The flexible package may be formed by a polymer and may include an adhesive on an exterior surface of a first portion of the flexible package. The adhesive may be in an inactive state that precludes the adhesive from bonding with a second, different portion of the flexible package or a different flexible package. The method may also include causing the adhesive to change from the inactive state to an active state. The active state may enable the adhesive to bond with the flexible package. The method may further include creating one or more folds in the second portion of the flexible package; and causing the second portion of the package, in which the one or more folds are created, to bond with the adhesive, in the active state, to close the flexible package.

DETAILED DESCRIPTION

FIGS. 1-8E are attached thereto and incorporated herein by this reference. The following detailed description refers to the accompanying FIGS. 1-8E. The same reference numbers in different figures may identify the same or similar elements.

An apparatus, system, method, technology, and/or technique, described herein, may include an improved flexible package of one or more plies (hereinafter, a "flexible package"), to store low cost content (e.g., snacks, cereal, vegetables, etc.), that can be resealed after opening using an activated non-mechanical resealable attached to all or a portion of the flexible package.

A non-mechanical resealable may include any type of temporary adhesive or temporary cohesive that has a first state that is inert, not sticky, and not tacky (hereinafter, "inert state") and a second state that, once activated, causes the adhesive to become active, sticky and/or tacky (hereinafter, "active state"). The temporary adhesive may include a pressure sensitive adhesive ("PSA"), a cohesive, and/or some other material that enables a portion of a flexible package to bond and/or seal repeatedly to such temporary adhesive and/or cohesive, and to unbond and/or unsealed repeatedly without damaging, tearing, or destroying the flexible package or temporary adhesive.

Activating the non-mechanical resealable, from the inert state to the active state, may, by way of non-limiting examples, include roughening, rubbing, and/or scoring the adhesive (e.g., with a utensil, such as a finger, fingernail, coin, emery board, fork, knife, steel wool, etc.); heating the adhesive to a temperature at, above, or near a glass transition temperature of the adhesive; dissolving to the soluble outer layer (e.g., by applying water or another solvent) or otherwise using an article (e.g., wiping with a wet or damp sponge, cloth, etc.) to remove a soluble protective outer layer that covers an active adhesive; peeling or otherwise removing all or a portion of a protective outer layer that covers an active adhesive; etc.

To avoid increasing the cost relative to a conventional flexible package, the flexible package, described herein, may be manufactured using a conventional mono-web and/or single-ply material, and a conventional manufacturing process, such that the non-mechanical resealable may be attached to, or integrated within, the flexible package in a manner that does not change, or add steps or complexity to the conventional manufacturing process.

Figure 1:
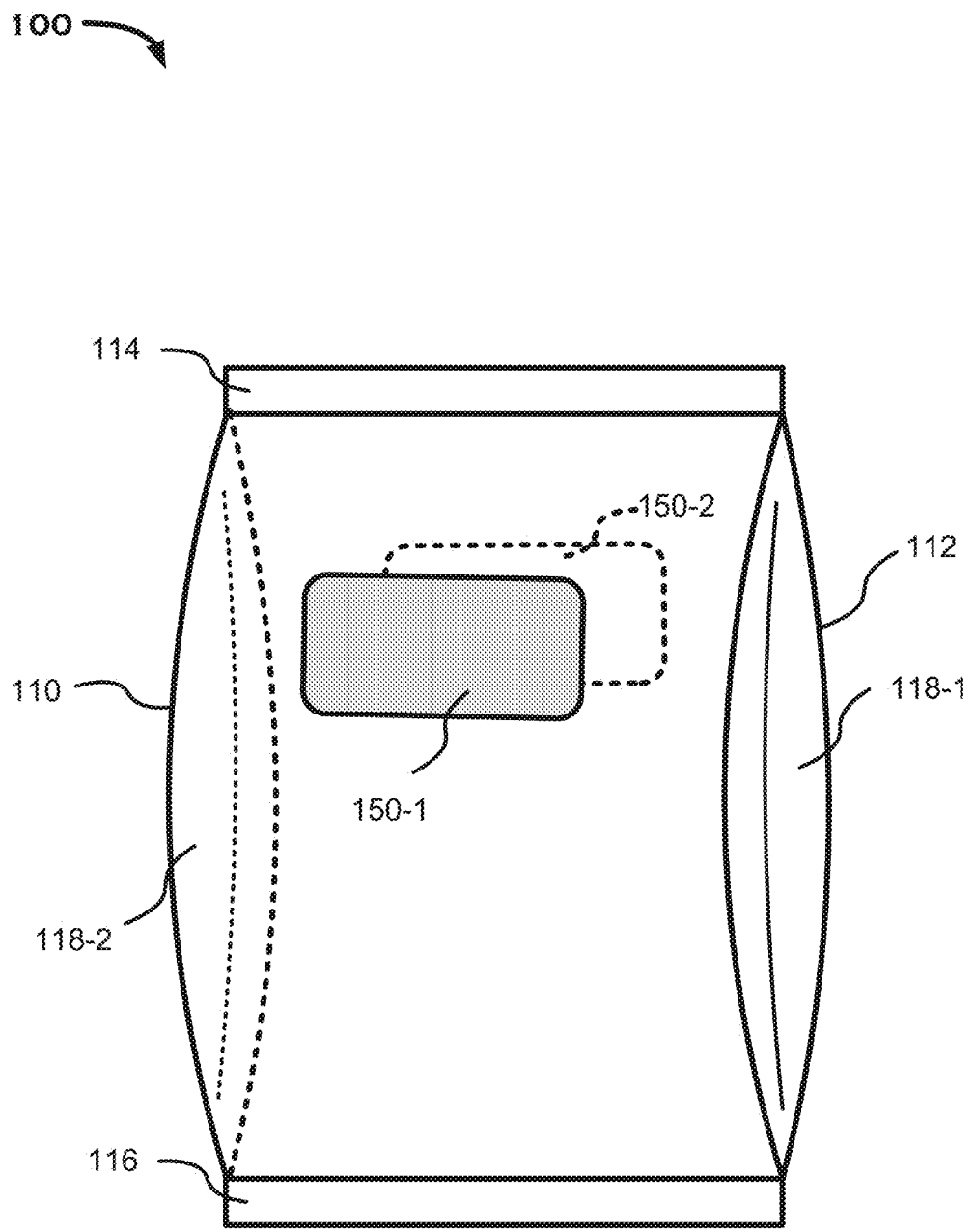
FIG. 1 is a diagram of an example flexible package according to an implementation described herein.

FIG. 1 is a diagram of an example flexible package 100 (hereinafter, "package 100") according to an implementation described herein. As illustrated in FIG. 1, package 100 may be formed by a flexible material that is suitable for storing, shipping, and/or displaying perishable and/or non-perishable goods in a manner that is air tight and water tight. By way of a non-limiting example, such a flexible material may include polyethylene (PE), polypropylene (PP), polystyrene (PS), polyamide (PA), nylon, textile, paper, or any combination thereof (hereinafter, "flexible material") that is suitable for storing and shipping perishable or non-perishable goods. While package 100 is described herein as being formed by a mono web and/or single-ply material, in other implementations, package 100 need not be so limited. For example, package 100 could also, or alternatively, be formed by a multi-ply material of one or more of the materials described above.

Package 100 may include a front panel 110, a back panel 112, a top seal 114, a bottom seal 116, a right side panel 118-1, a left side panel 118-2 (sometimes referred to individually as "side panel 118" and together as "side panels 118"), and/or one or more non-mechanical resealable patches 150-1 and 150-2 (hereafter, each a "patch 150" and together, "patches 150").

The number of components, illustrated in FIG. 1, is provided for explanatory purposes only and is not intended to be so limited. Additionally, or alternatively, package 100 may include additional components, fewer components, different components, or differently arranged components than illustrated in FIG. 1. For example, an edge and/or perimeter of front panel 110 may be attached and/or sealed to an edge and/or perimeter of back panel 112, without any right side panel 118 and/or left side panel 118, to form an airtight and/or watertight interior cavity between front panel 110 and back panel 112 in which perishable and/or non-perishable content may be stored. Also, in some implementations, one or more of the components of package 100 may perform one or more functions described as being performed by another one or more of the components of package 100.

Front panel 110, back panel 112, and/or side panels 118 may be formed by a flexible material of sufficient strength and flexibility to enable package 100 to store perishable and non-perishable content and/or to permit such content to be shipped, displayed, sold, and/or removed from an opening in package 100 once opened. Front panel 110 may be attached and/or sealed to side panels 118 (e.g., at one or more sides of Front panel 110). Back panel 112 may be attached and/or sealed to side panels 118 (e.g., at one or more sides of back panel 110). An upper portion of front panel 110 may be permanently and/or temporarily attached, sealed, bonded, welded, etc. to an upper portion of back panel 112 to form top seal 114. A lower portion of front panel 110 may be permanently and/or temporarily attached, sealed, bonded, welded, etc. to a lower portion of back panel 112 to form bottom seal 116. Thus, package 100 may form an air tight and/or water tight interior cavity in which perishable and/or non-perishable content can be stored, based on the top seal 114, bottom seal 116, the seals between side panels 118 and front panel 110, and the seals between side panels 118 and back panel 112.

Additionally, or alternatively, in other implementations, all or a portion of front panel 110, side panels 118, and/or back panel 112 may be formed as a continuous material. For example, front panel 110 and side panels 118 may be one piece of material such that seals are not necessary between front panel 110 and side panels 118. In another implementation, back panel 112 and side panels 118 may be one piece of material such that seals are not necessary between back panel 112 and side panels 118. In a further implementation, front panel 110, side panels 118, and back panel 112 may be formed from one piece of material (e.g., sleeve, cylinder).

Patch 150 may be formed by a temporary adhesive or cohesive that is attached to all or a portion of front panel 110 (e.g., shown as the shaded and rounded rectangle labeled 150-1) back panel 112 (e.g., shown as the dashed rounded rectangle labeled 150-2), top seal 114 (e.g., not shown in FIG. 1), bottom seal 116 (e.g., not shown in FIG. 1), or side panel 118 (e.g., not shown in FIG. 1). In a manner to be described below with respect to FIGS. 2A-3C, when activated, patch 150 may enable package 100, once opened, to be temporarily resealed and/or reclosed to protect contents stored therein from spoiling, becoming stale, or otherwise being damaged and/or destroyed. Additionally, or alternatively, patch 150, when activated, may enable package 100 to be repeatedly resealed and reopened in a manner that does not tear and/or destroy the material on which patch 150 is formed.

Figure 2A:
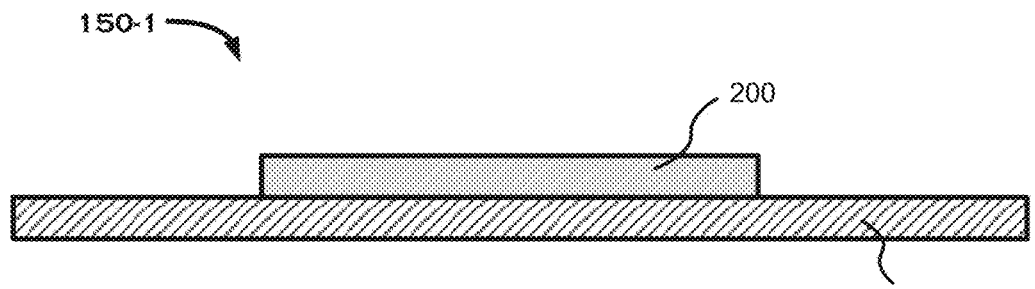
FIGS. 2A-2C are diagrams of an example non-mechanical resealable component of the flexible package identified in FIG. 1.
Figure 2B:
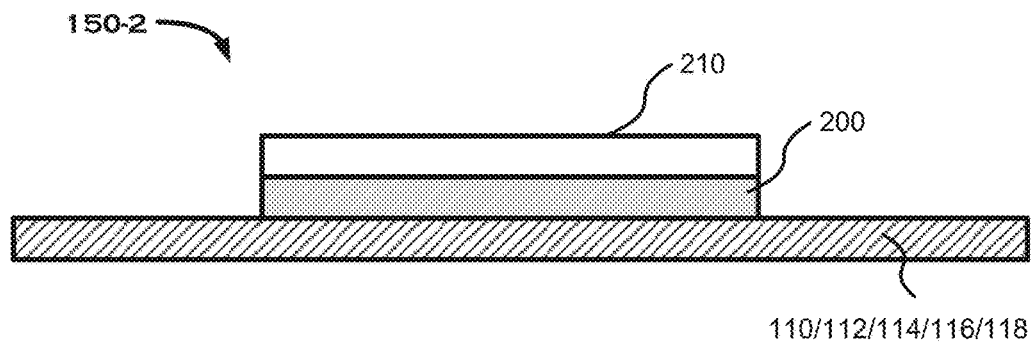
Figure 2C:
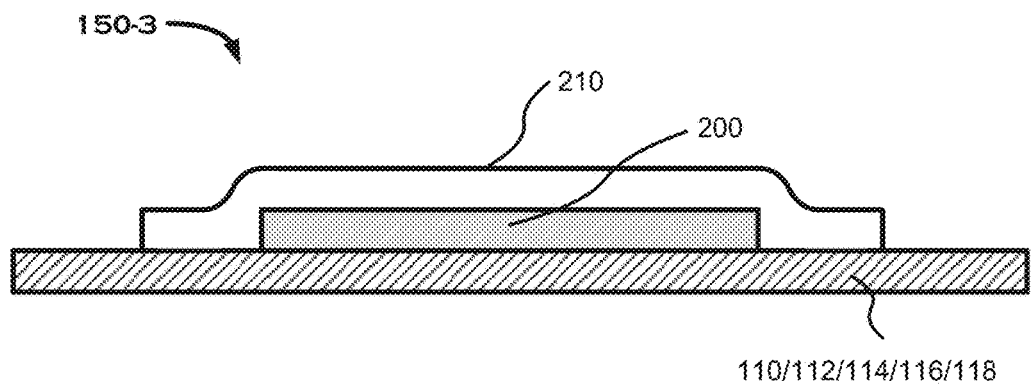

FIGS. 2A-2C are diagrams of example non-mechanical patches 150-1, 150-2 and 150-3, respectively, of package 100 identified in FIG. 1. As shown in FIG. 2A, patch 150-1 may include a temporary adhesive 200 (hereinafter, "adhesive 200") that is attached to package 100 (e.g., front panel 110, back panel 112, top seal 114, bottom seal 116, side panel 118, etc.). Adhesive 200 may be a temporary adhesive, such as a PSA (e.g., an acrylic-based PSA, a styrene block copolymer ("SBC") PSA, etc.). Adhesive 200 may be in the form of a patch, tape, etc. that is permanently bonded and/or attached, on a first surface of adhesive 200, to front panel 110 and/or back panel 112. In a non-limiting example, adhesive 200 may be printed and/or sprayed on package 100 and allowed to dry and/or cure to a solid form that is in an inert state (e.g., non-sticky, non-tacky, etc.) prior to being activated in a manner described below with respect to FIG. 3A.

As shown in FIG. 2B, patch 150-2 may include adhesive 200, as described above in FIG. 2A, that is bonded and/or attached, on a first surface of adhesive 200, to package 100 (e.g., front panel 110, back panel 112, top seal 114, bottom seal 116, side panel 118, etc.), as well as an activation layer 210 that is attached to a second surface, of adhesive 200, that is opposite the first surface of adhesive 200. Adhesive 200, in this non-limiting example, may be in an active state (e.g., sticky, tacky, etc.), but kept "inert" by activation layer 210 to prevent adhesive 200 from undesirable bonding with adjacent packages 100 (e.g., during shipping, display, etc.) and/or collecting debris (e.g., during packaging, shipping, prior to sale, etc.).

Activation layer 210 may, for example, be formed by a material that can dissolve in the presence of a solvent (e.g., by applying, spraying, immersing, etc. with water or some other solvent); can be wiped away or removed with a wet or damp cloth or sponge (e.g., a water soluble film, compound, polymer, etc.); can be rubbed or scraped away (e.g., such as a water-based scratch of material, Buna-N rubber, photopolymer coating, wax-based coating, silicon-coating, etc.); and/or can be peeled away (but not removed entirely) to expose all or a portion of adhesive 200 in an active state. Activation layer 210 may also, or alternatively, be formed as a patch or tape that is temporarily bonded and/or attached to all or a portion of the second surface adhesive 200. In a non-limiting example, activation layer 210 may be printed and/or sprayed on adhesive 200 and allowed to dry and/or cure to a solid form. Additionally, or alternatively, activation layer 210 may be attached and/or bonded to adhesive 200 and the combination of adhesive 200 and activation layer 210 by be attached and/or bonded to package 100 (e.g., front panel 110, back panel 112, side panel 118, top seal 114, bottom seal 116, etc.). Patch 150-2 may be activated to cause activation layer 210 to dissolve and/or otherwise be removed from adhesive 200 in a manner described below with respect to FIG. 3B.

As shown in FIG. 2C, patch 150-3 may include adhesive 200 and activation layer 210, as described above with respect to FIG. 2B, except that activation layer 210 may extend beyond one or more edges of adhesive 200 (e.g., in the active state), such that a portion of activation layer 210 makes contact with, is attached to and/or bonds with package 100 (e.g., front panel 110, back panel 112, top seal 114, bottom seal 116, side panel 118, etc.). In a manner similar to that described above, activation layer 210 may be removed, from adhesive 200, by dissolving in the presence of a solvent (e.g., by applying, spraying, immersing with water or some other solvent); wiping with a damp cloth or sponge (e.g., a water soluble film, compound, polymer, etc.); rubbing or scraping away (e.g., an overlaquer, surface printed ink, etc. with low adhesion properties allowing activation layer to be scratched away); and/or by peeling away (but not completely removing or detaching) activation layer 210 to expose all or a portion of adhesive 200 in an active state. Patch 150-3 may be activated by causing activation layer 210 to dissolve and/or otherwise be removed from adhesive 200 in a manner described below with respect to FIG. 3C.

Figure 3A:
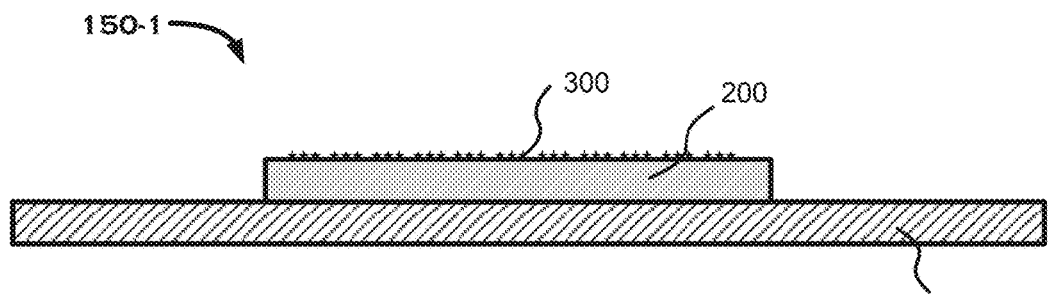
FIGS. 3A-3F are diagrams of the example non-mechanical resealable components of FIGS. 2A-2C after being activated according to an implementation described herein.
Figure 3B:
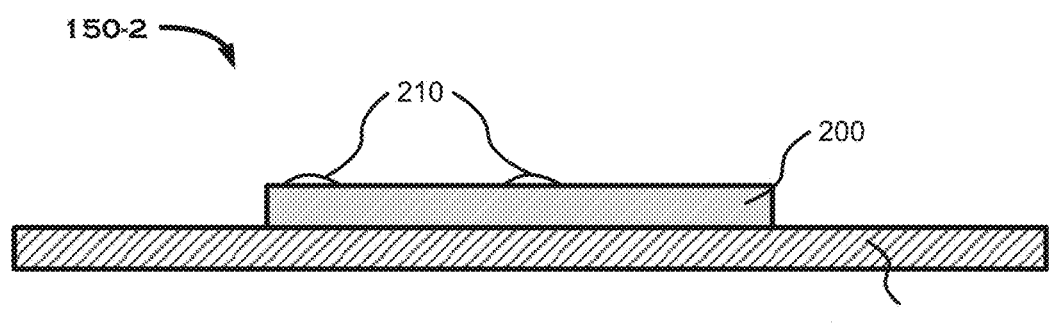
Figure 3C:
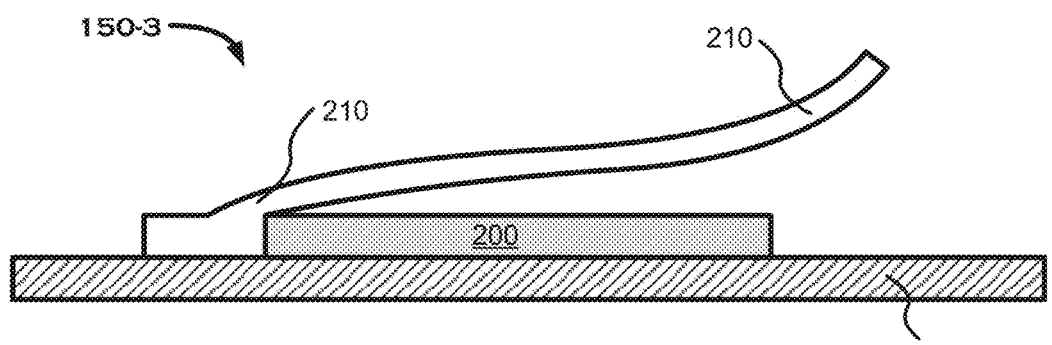
Figure 3D:
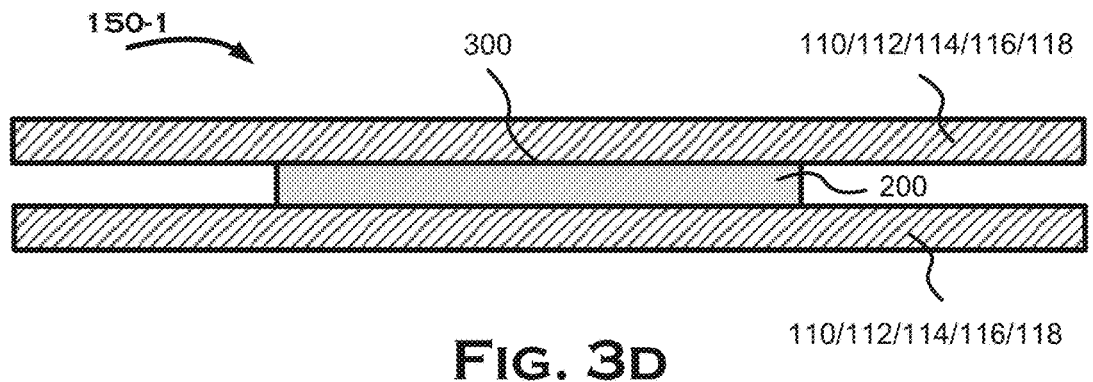
Figure 3E:
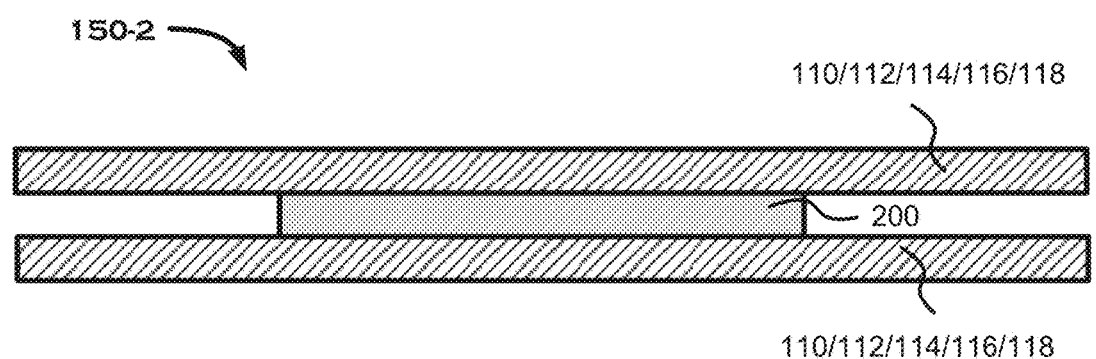
Figure 3F:
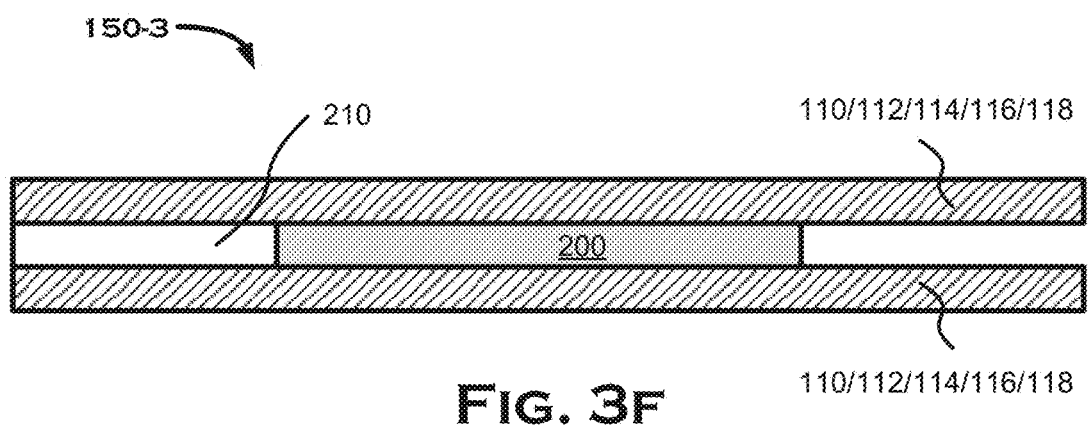

FIGS. 3A-3F are diagrams of the example patches 150-1, 150-2 and 150-3, respectively, of FIGS. 2A-2C after being activated according to an implementation described herein. As shown in FIG. 3A, patch 150-1 may be activated, by a user or consumer of package 100, by roughening, scratching, rubbing, or scraping the second surface, of adhesive 200 (e.g., using an abrasive utensil such as a finger, finger nail, emery board, fork, knife, steel wool, etc.), to create a bonding surface 300, associated with adhesive 200, that is sticky, tacky and/or otherwise able to bond to another portion of package 100. Bonding surface 300 may be the result of adhesive 200 changing from the inert state to the active state by increasing the surface area of the second surface, which may increase a measure of stickiness, tackiness, adhesive qualities, and/or bond strength of adhesive 200. Additionally, or alternatively, patch 150-1 may be activated by heating the second surface, of adhesive 200 (e.g., with friction by rubbing, with hot water, with hot air using a hair dryer, etc.), to create bonding surface 300. Bonding surface 300 may enable adhesive 200 to adhere to another portion of package 100 (e.g., front panel 110, back panel 112, top seal 114, bottom seal 116, side panel 118, etc.) as shown in FIG. 3D. Thus, the active state, of adhesive 200 (e.g., now with bonding surface 300), may enable a user to reclose package 100 in a manner to be described in greater detail below with respect to FIGS. 4 and 5.

As shown in FIG. 3B, patch 150-2 may be activated, by a user or consumer of package 100, by removing activation layer 210 from adhesive 200. In a manner similar to that described above with respect to FIG. 2B, the user may remove activation layer 210 by applying, spraying, immersing activation layer 210 in a solvent (e.g., such as water, etc.) to cause activation layer 210 to dissolve and/or flow away from adhesive 200. Additionally, or alternatively, the user may use an article to remove all or a portion of activation layer 210 by wiping activation layer 210 (e.g., with a wet or damp sponge or cloth that holds a solvent) to expose adhesive 200. Additionally, or alternatively, the user may peel back all or a portion of activation layer 210 to expose all or a portion of adhesive 200 without removing activation layer 210 completely from package 100. In this example, adhesive 200 may already be in the active state (e.g., tacky, sticky, etc.) to enable adhesive 200 to adhere and/or bond to another portion of package 100 (e.g., front panel 110, back panel 112, top seal 114, bottom seal 116, side panel 118, etc.) in the manner shown in FIG. 3E. Thus, the active state, of adhesive 200 (e.g., now with activation layer 210 removed or peeled back), may enable a user to reclose package 100 in a manner to be described in greater detail below with respect to FIGS. 4 and 5.

As shown in FIG. 3C, adhesive 200, of patch 150-3, may be activated, in a manner similar to that described above with respect to FIG. 3B, when a user or consumer, of package 100, removes activation layer 210 from adhesive 200. In a manner similar to that described above with respect to FIG. 3B, the user may remove activation layer 210 by peeling activation layer 210 from the second surface of adhesive 200 exposing all or a portion of adhesive 200 in the active state. In this example, activation layer 210 may be peeled back, by the user, while at least a portion, of activation layer 210, remains bonded to package 100 (e.g., front panel 110, back panel 112, top seal 114, bottom seal 116, side panel 118, etc.) Other methods of removing activation layer 210 may also, or alternatively, be used (e.g., spraying a solvent, wiping with a wet or damp sponge, etc.). In this example, adhesive 200 may already be in the active state (e.g., tacky, sticky, etc.) to enable adhesive 200 to adhere to another portion of package 100 (e.g., front panel 110, back panel 112, top seal 114, bottom seal 116, side panel 118, etc.) in the manner shown in FIG. 3F. Thus, the active state of adhesive 200 (e.g., now with activation layer 210 removed or peeled back) may enable a user to reclose package 100 in a manner to be described in greater detail below with respect to FIGS. 4 and 5.

Figure 4:
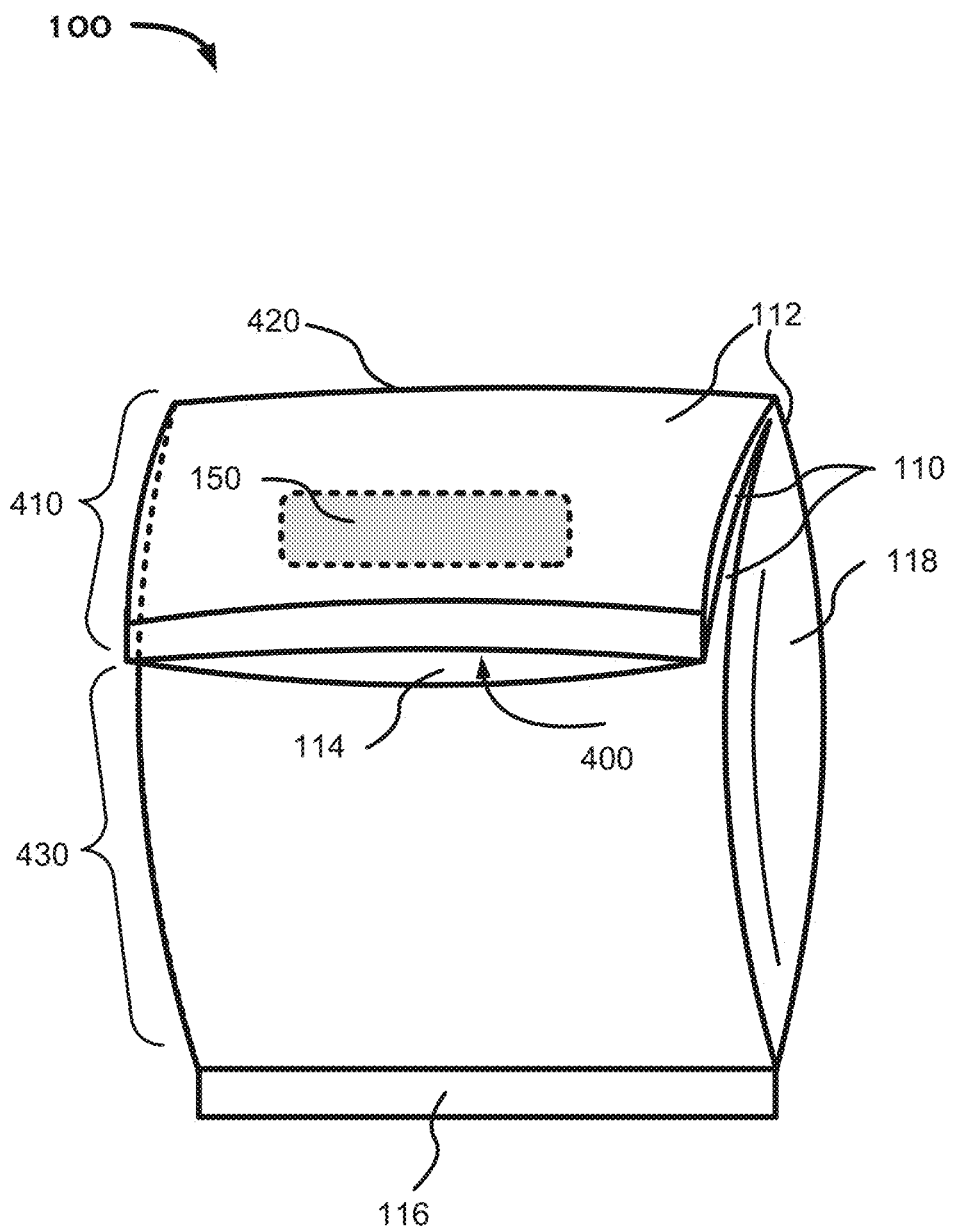
FIG. 4 is a diagram of a flexible package after being opened and resealed using an activated non-mechanical resealable on the exterior surface of the package.

FIG. 4 is a diagram of flexible package 100 after being opened and resealed using a patch 150 on the exterior surface of package 100. As shown in FIG. 4, package 100 may include patch 150 on front panel 110 (e.g., shown as the dotted rounded rectangle 150). Package 100 may, for example, be opened by separating front panel 110 from back panel 112 at top seal 114 to create an opening 400, into package 100, via which contents, within package 100, may be accessed. To reclose or reseal package 100, the user may activate patch 150 in a manner similar to that described with respect to FIGS. 3A-3F. In this example, the user may make a fold 420 in package 100 to reclose and/or reseal package 100.

In a non-limiting example, the user may fold a top portion 410, of package 100, at fold 420, over onto a bottom portion 430 of package 100. More particularly, the user may cause an upper portion of front panel 110, associated with top portion 410 of package 100, to make contact with patch 150 and/or a lower portion of front panel 110 associated with bottom portion 430 of package 100. When top portion 410 makes contact with patch 150, the upper portion of front panel 110 may bond with patch 150. Such bonding with patch 150 may maintain fold 420 thereby reclosing and/or resealing package 100.

Figure 5:
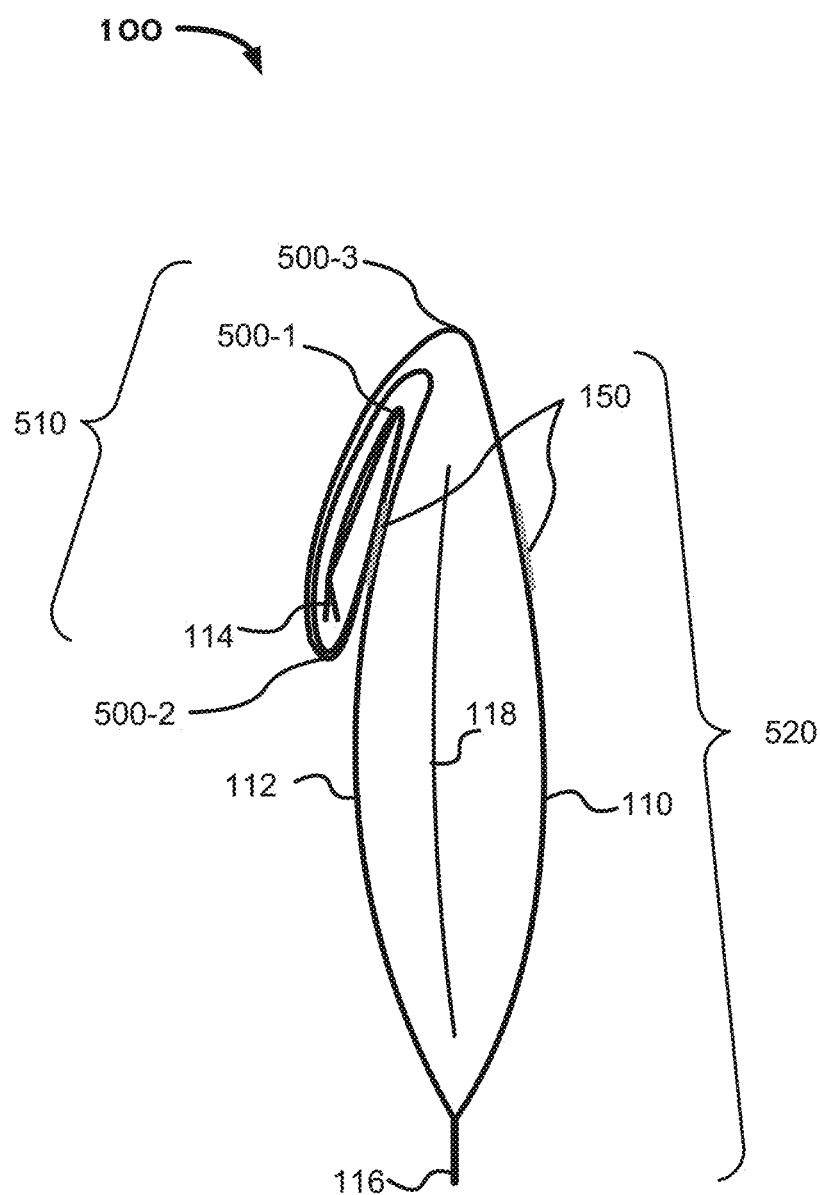
FIG. 5 is a diagram of a side view of a flexible package that has been resealed using an activated non-mechanical resealable on the exterior surface of the package.

FIG. 5 is a diagram of a side view of package 100 that has been resealed using multiple folds and patch 150 on the exterior surface of package 100. As shown in FIG. 4, package 100 may include patch 150 on front panel 110 and back panel 112. Package 100 may, in a manner similar to that described above, with respect to FIG. 4, be opened by separating front panel 110 from back panel 112 at top seal 114 to create an opening 400 (not shown in FIG. 5), into package 100, via which contents, within package 100, may be accessed. To reclose or reseal package 100, the user may, for example, activate patch 150, associated with back panel 112, in a manner similar to that described with respect to FIGS. 3A-3F. In this example, the user may make two or more folds in package 100 to reclose and/or reseal package 100.

In a non-limiting example, the user may create a first fold 500-1 near the top of package 100 (e.g., by rolling seal 114, back panel 112 and front panel 110 over onto back panel 112). The user may, in a similar manner, make one or more additional folds 500 (e.g., shown as 500-2 and 500-3) in a top portion 510 of package 100, such that the first fold 500-1 is encircled inside of additional folds 500 and the top portion of package (e.g., in proximity of top seal 114). Additionally, or alternatively, the user may cause the top portion 510 including an upper portion of back panel 112, associated with top portion 510, to make contact with patch 150 located on a lower portion of back panel 112, associated with a bottom portion 520 of package 100. When top portion 510 makes contact with patch 150, the upper portion of back panel 112 may bond with patch 150 which may maintain folds 500-1-500-3 and thereby reclosing and/or resealing package 100.

Figure 6A:
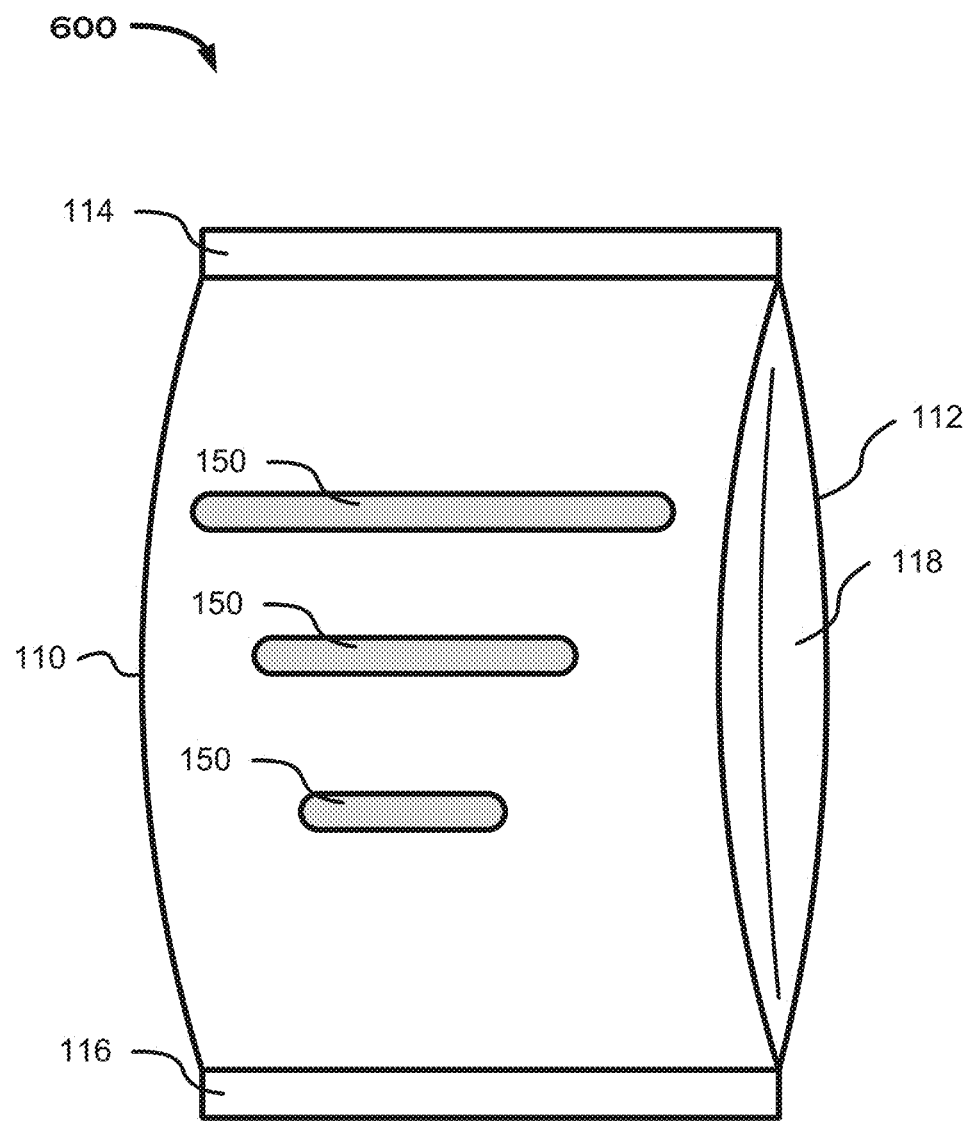
FIGS. 6A-6C are diagrams of example flexible packages with a variety of configurations of non-mechanical resealable components attached thereto.
Figure 6B:
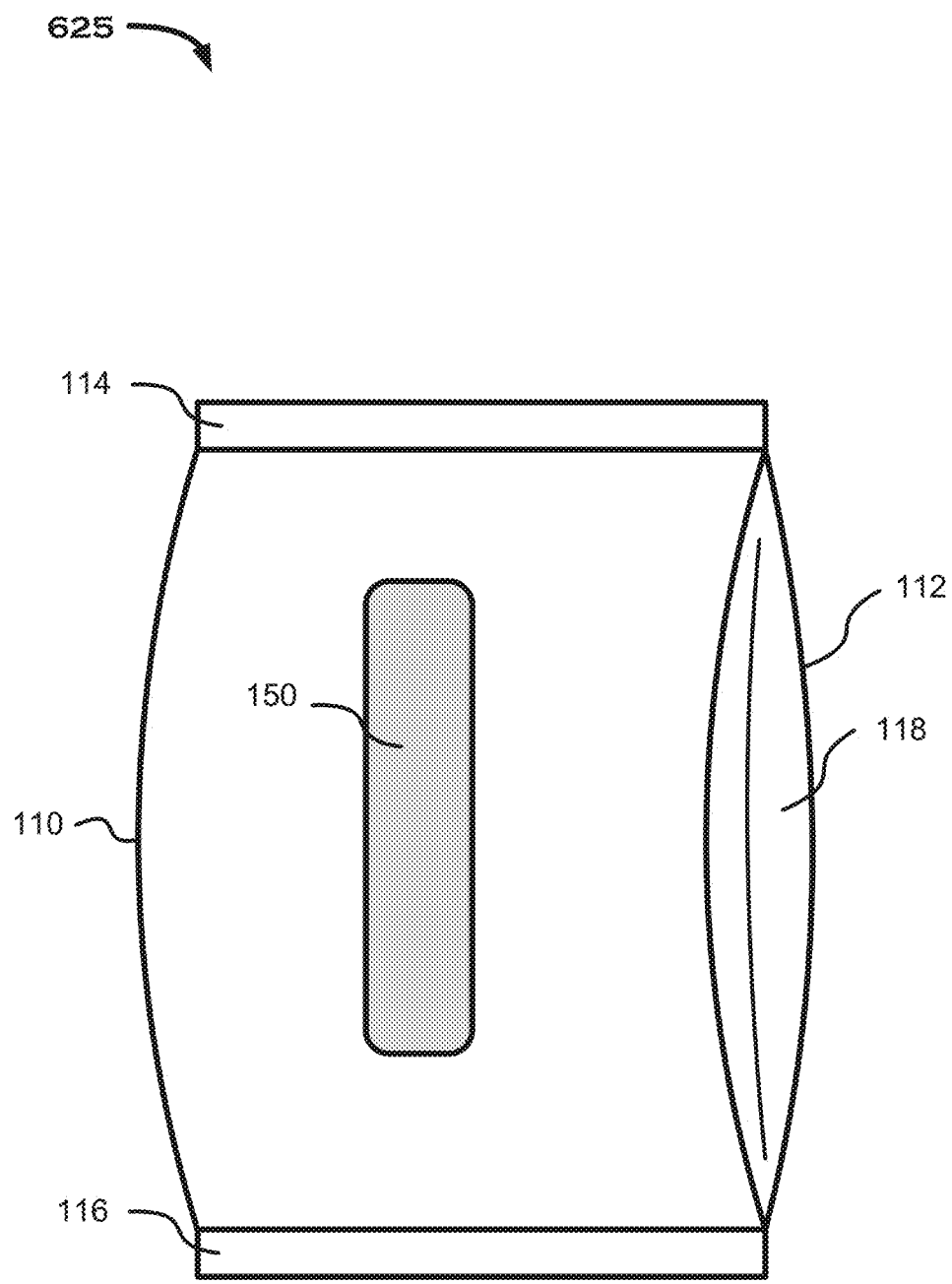
Figure 6C:
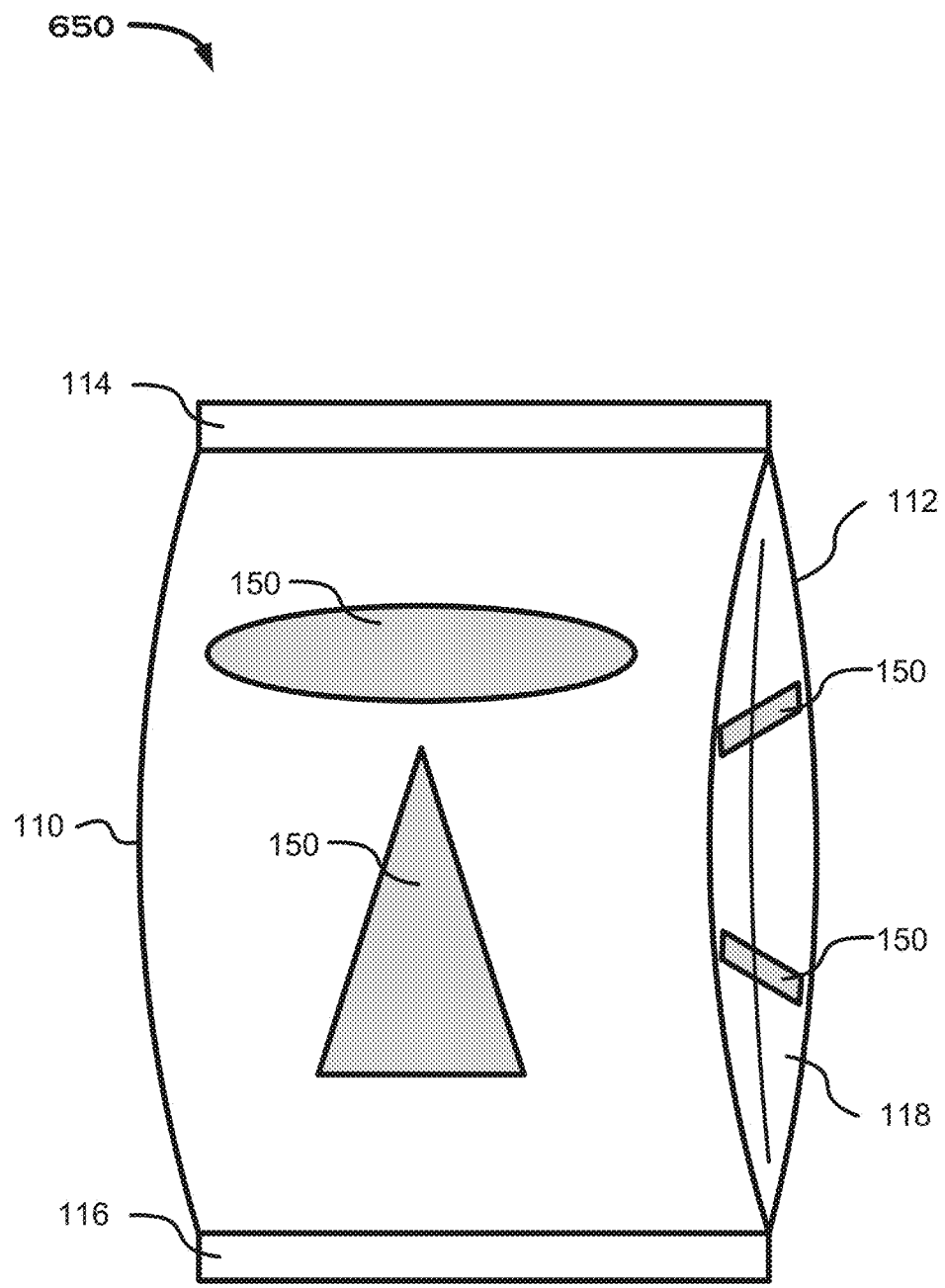

FIGS. 6A-6C are diagrams of example flexible packages 600-650, respectively, with a variety of configurations of patches 150 attached thereto. As shown in FIG. 6A, flexible package 600 (hereinafter, "package 600") may include one or more components and/or features, described above with respect to package 100 of FIG. 1, as well as a collection of generally horizontally-oriented patches 150 (hereinafter, collectively, "horizontal patches 150" and, individually, "horizontal patch 150") located on front panel 110 and/or back panel 112. Each horizontal patch 150 may be of a different size, area and/or dimension. Each horizontal patch 150 may also, or alternatively, be attached to package 600 at a different and/or discrete location to enable package 600 to be reclosed and/or resealed using the different and/or discrete locations, and/or different sizes, areas, and/or dimensions of horizontal patches 150. In a non-limiting example, when package 600 is opened and reclosed after none, or a small portion, of the contents are removed, the user may reclose and/or reseal package 600 using one or more of the upper-most horizontal patches 150 in a manner similar to that described above with respect to FIGS. 4 and/or 5. When a greater portion of the contents are removed, the user may reclose and/or reseal package 600 using one or more of the middle and/or lower-most horizontal patches 150 in a manner similar to that described above with respect to FIGS. 4 and/or 5. As the amount of contents are removed from package 600, the user may reclose and/or reseal package 600 using one or more horizontal patches 150 that are at progressively lower locations on package 600. In another non-limiting example, package 600 may be reclosed and/or resealed in a manner similar to that described above with respect to FIGS. 4 and 5, as well as by causing an upper horizontal patch 150 to come into contact with a lower horizontal patch 150 to enable adhesive 200, associated with the upper horizontal patch 150, to bond with adhesive 200 associated with a lower horizontal patch 150.

As shown in FIG. 6B, flexible package 625 (hereinafter, "package 625") may include one or more components and/or features described above with respect to package 100 of FIG. 1, as well as a generally vertically-oriented patch 150 (hereinafter, "vertical patch 150") located on front panel 110 and/or back panel 112. Vertical patch 150 may be of different sizes, areas, shapes and/or dimensions. Vertical patch 150 may also, or alternatively, be attached, to package 625, at different locations to enable package 625 to be reclosed and/or resealed over a continuous range of vertical locations that correspond to the length, of vertical patch 150, in a vertical dimension relative to package 625. In a non-limiting example, as an increasing amount of content is removed over time, from package 625, the user may reclose and/or reseal package 625, in a manner similar to that described above with respect to FIGS. 4 and 5, over continuously lower vertical locations, of package 625, using vertical patch 150. In another non-limiting example, package 625 may be reclosed and/or resealed in a manner similar to that described above with respect to FIGS. 4 and 5, as well as by causing an upper portion of vertical patch 150 to come into contact with a lower portion of vertical patch 150 to enable adhesive 2100, associated with the upper portion, to bond with adhesive 200 associated with the lower portion of vertical patch 150.

As shown in FIG. 6C, flexible package 650 (hereinafter, "package 650") may include one or more components and/or features described above with respect to package 100 of FIG. 1, as well as a combination of vertical patches 150, horizontal patches 150, and/or patches 150 associated with an orientation that is neither vertical nor horizontal (hereinafter "diagonal patch 150") located on front panel 110, back panel 112, and/or side panel 118 (e.g., shown as the parallelogram-shaped diagonal patch 150 on side panel 118 in FIG. 6C). Additionally, or alternatively, vertical patch 150, horizontal patch 150, or diagonal patch 150 may be formed according to any shape (e.g., triangular, trapezoidal, parallelogram, circular, elliptical, pentagonal, irregular, etc.). Package 650 may be reclosed and/or resealed in a manner similar to that described above with respect to FIGS. 4-6B.

Figure 7:
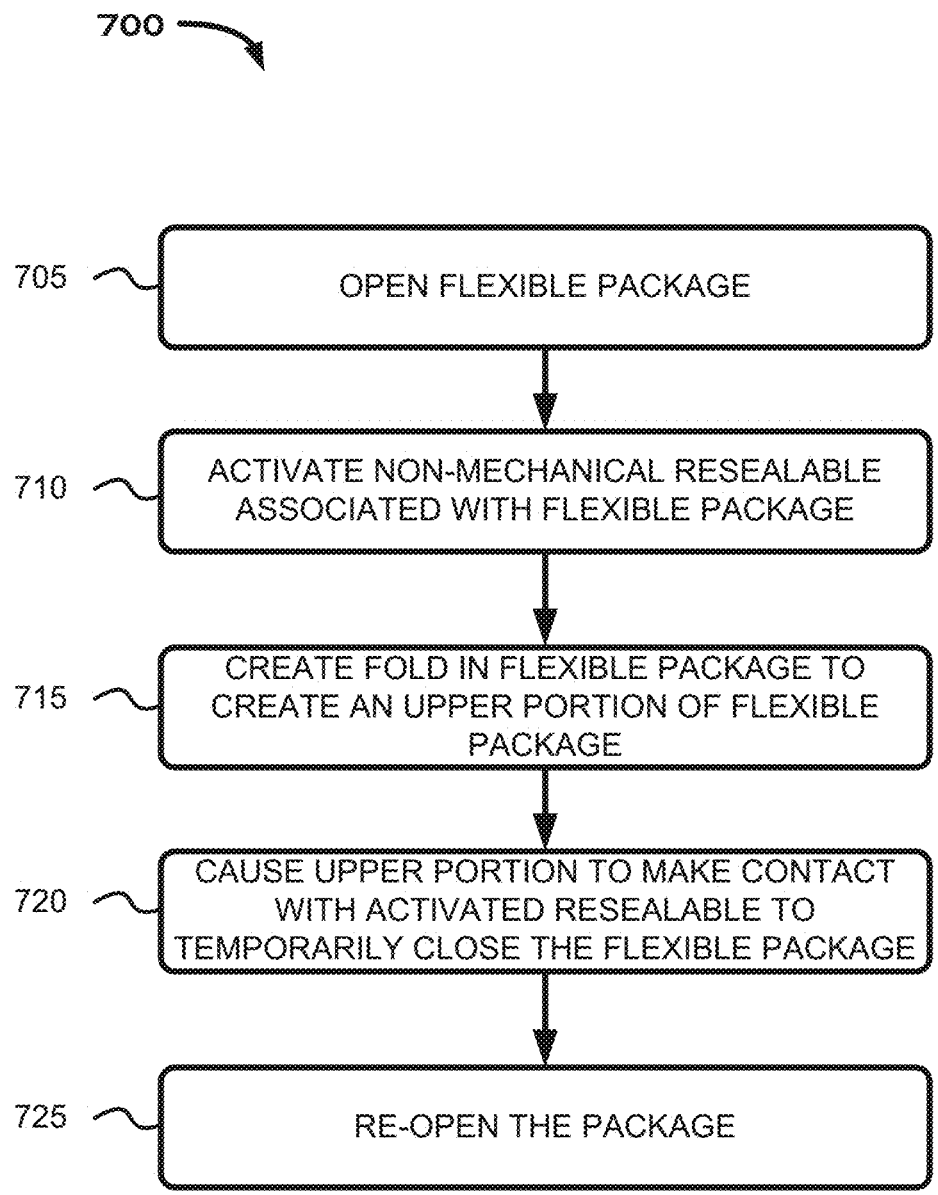
FIG. 7 is a flowchart of an example process for opening a flexible package, activating the non-mechanical resealable attached to an exterior surface thereof and resealing the flexible package using the activated non-mechanical resealable.

FIG. 7 is a flowchart of an example process 700 for opening a flexible package, activating patch 150 attached to an exterior surface thereof and resealing the flexible package using the activated non-mechanical resealable. FIGS. 8A-8E are diagrams of example flexible packages 800 (hereinafter, "package 800") that may include patch 150 that can be used to reclose and/or reseal package 800 after opening. All or a portion of process 700, of FIG. 7, will be described below with reference to package 800 of FIGS. 8A-8E.

Figure 8A:
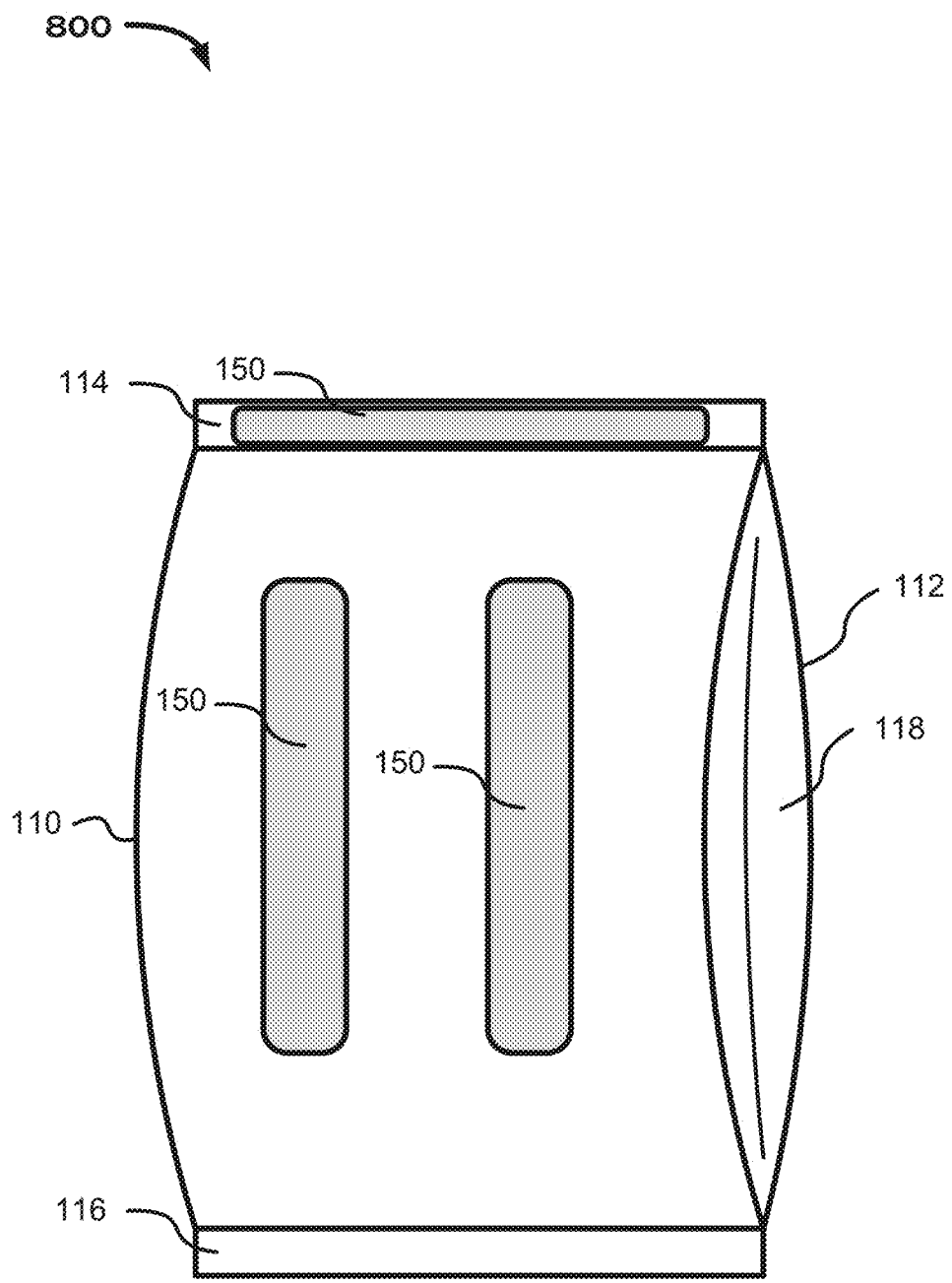
FIGS. 8A-8E are diagrams of an example flexible package with a non-mechanical resealable that can be used to reseal the flexible package after opening.
Figure 8B:
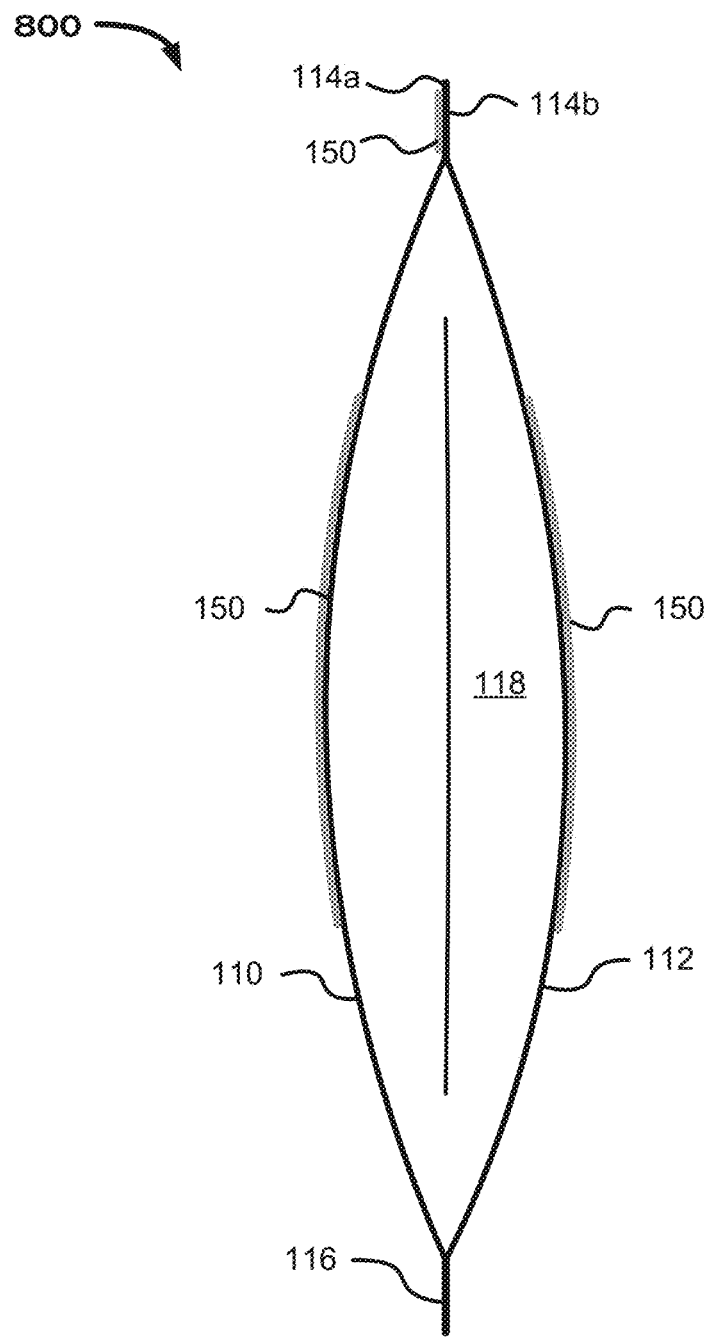

As shown in FIG. 7, process 700 may include opening a flexible package (BLOCK 700) and activating a non-mechanical resealable associated with the flexible package (BLOCK 710). For example, a user may open a low cost flexible package, such as that shown in FIG. 8A, by causing front panel 110 to separate from back panel 112 (e.g., by grasping and pulling apart front panel 110 from back panel 112) to create an opening via top seal 114. As shown in FIGS. 8A and 8B, package 800 may include one or more components and/or features described above with respect to package 100 of FIG. 1 and/or any of packages 600-650 of FIGS. 6A-6C, such as, for example, front panel 110, back panel 112, top seal 114, bottom seal 116, one or more side panels 118, and/or one or more patches 150. In this non-limiting example, one or more patches 150 may be attached to an exterior surface of front panel 110 and/or a first surface 114a of top seal 114 that corresponds to an upper-most portion of front panel 110. Although not shown in FIG. 8A or 8B, in another non-limiting example, one or more patches 150 may be attached to an exterior surface of back panel 112 and/or a second surface 114b, of top seal 114, that corresponds to an upper-most portion of back panel 112.

The number of components, illustrated in FIGS. 8A-8E, is provided for explanatory purposes only and is not intended to be so limited. Additionally, or alternatively, package 800 may include additional components, fewer components, different components, or differently arranged components than illustrated in FIGS. 8A-8E. For example, front panel 110 may be directly connected and/or sealed to back panel 112 without any right side panel 118 and/or left side panel 120. Also, in some implementations, one or more of the components of package 800 may perform one or more functions described as being performed by another one or more of the components of package 800.

Figure 8C:
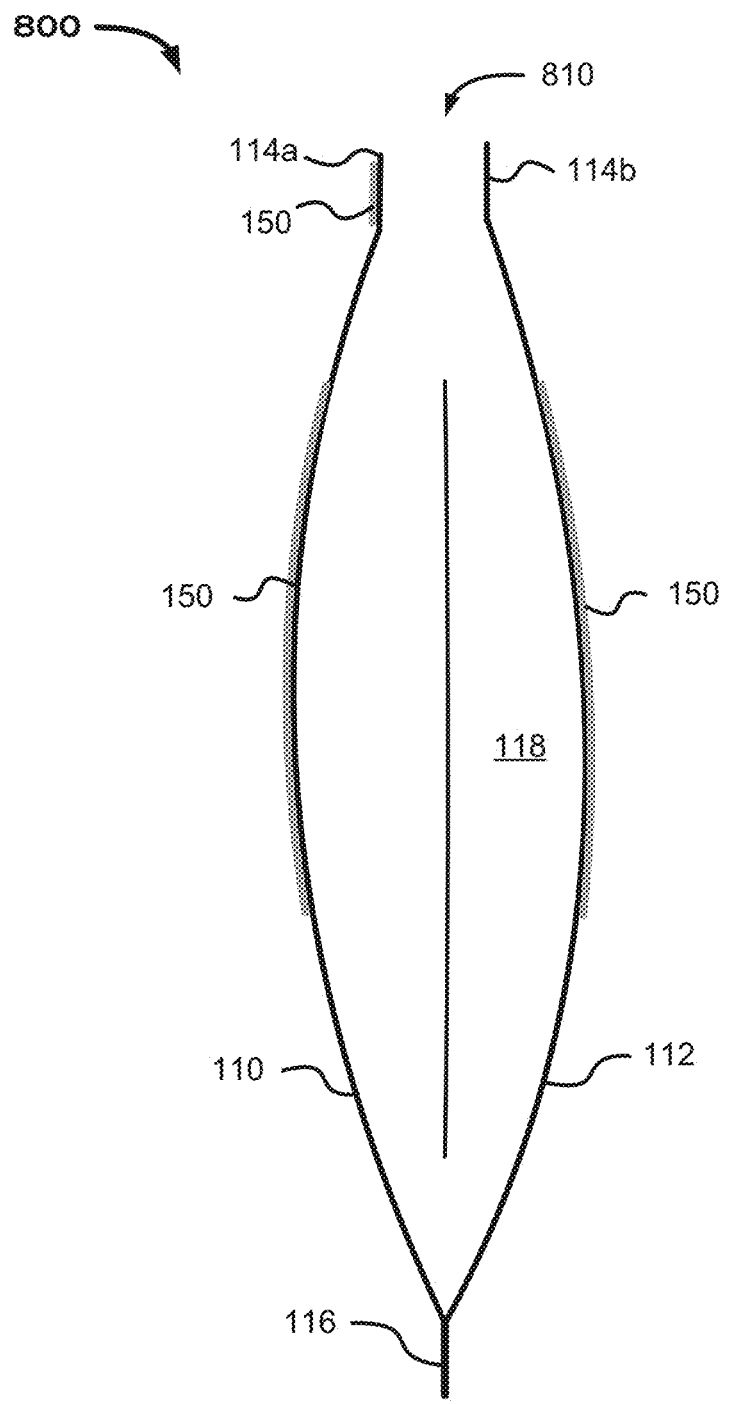

The user may grasp front panel 110 and back panel 112 and may pull front panel 110 apart from back panel 112, in generally opposite directions, break top seal 114 (e.g., by causing first surface 114a to separate from second surface 114b). As illustrated in FIG. 8C, separating first surface 114a from second surface 114b may create an opening 810, in package 800, via which content, stored within package 800, may be accessed and/or removed.

The user may, in a manner similar to that described above with respect to FIGS. 3A-3C, activate patch 150 to enable package 800 to be temporarily reclosed and/or resealed. In the event that patch 150 does not include an activation layer 210 (e.g., patch 150-1 of FIGS. 2A and 3A), the user may, in a non-limiting example, activate patch 150 by roughening, scratching, rubbing, and/or scraping a second, outer surface, of adhesive 200 (e.g., using an abrasive utensil such as a finger, finger nail, coin, emery board, fork, knife, steel wool, etc.), to create bonding surface 300 associated with adhesive 200. Bonding surface 300 may be sticky, tacky and/or otherwise able to bond to another portion of package 800. Additionally, or alternatively, the user may activate patch 150 by heating the second, outer surface of adhesive 200 (e.g., with friction by rubbing, with hot water, with hot air using a hair dryer, etc.), to create bonding surface 300. The amount of heating, applied to adhesive 200, may cause a temperature, of the second surface of adhesive 200, to increase to within a certain amount of a glass transition temperature (e.g., $T_G$), of adhesive 200 (e.g., +/−1%, 5%, 10%, etc. of $T_G$), to enable adhesive 200 to become sticky, tacky, and/or otherwise adhere to another portion of package 800.

In the event that patch 150 include an activation layer 210 that covers adhesive 200 (e.g., patch 150-2 and/or 150-3 of FIGS. 2B and 3B and/or FIGS. 2C and 3C, respectively), the user may, in a non-limiting example, activate patch 150 by removing activation layer 210 to expose adhesive 200 that is in an active state (e.g., sticky, tacky, and/or otherwise able to bond with package 800). Such removal, of activation layer 210, may be performed by applying, spraying, and/or immersing activation layer 210 in a solvent (e.g., such as water, etc.) to cause activation layer 210 to dissolve and/or flow away from adhesive 200. Additionally, or alternatively, the user may remove all or a portion of activation layer 210 by wiping activation layer 210 with a wet or damp sponge or cloth to expose adhesive 200. Additionally, or alternatively, the user may peel back all or a portion of activation layer 210 to expose all or a portion of adhesive 200 without removing activation layer 210 completely from package 800. Thus, the active state, of adhesive 200, may enable a user to temporarily reclose and/or reseal package 800.

As also shown in FIG. 7, process 700 may include creating a fold, in the flexible package, to form an upper portion of the flexible package (BLOCK 715) and causing the upper portion to make contact with the activated non-mechanical resealable to temporarily close the flexible package (BLOCK 720). For example, in a manner similar to that described above with respect to FIG. 4, the user may create a fold (e.g., similar to fold 420 of FIG. 4), in package 800, to enable an upper portion of package 800 to be folded back, onto itself, to cause the upper portion of front panel 110 (or back panel 112) to adhere to and/or bond with one or more activated patches 150 on front panel 110 (or back panel 112) to temporarily reclose and/or reseal package 800. In another non-limiting example and in a manner similar to that described with respect to FIG. 5, the user may create two or more folds (e.g., similar to folds 500 of FIG. 5), in package 800, to enable an upper portion of package 800 to be folded back, onto itself, to cause an upper portion of front panel 110 (or back panel 112) to adhere to and/or bond with one or more activated patches 150 on front panel 110 (or back panel 112) to temporarily reclose and/or reseal package 800.

Figure 8D:
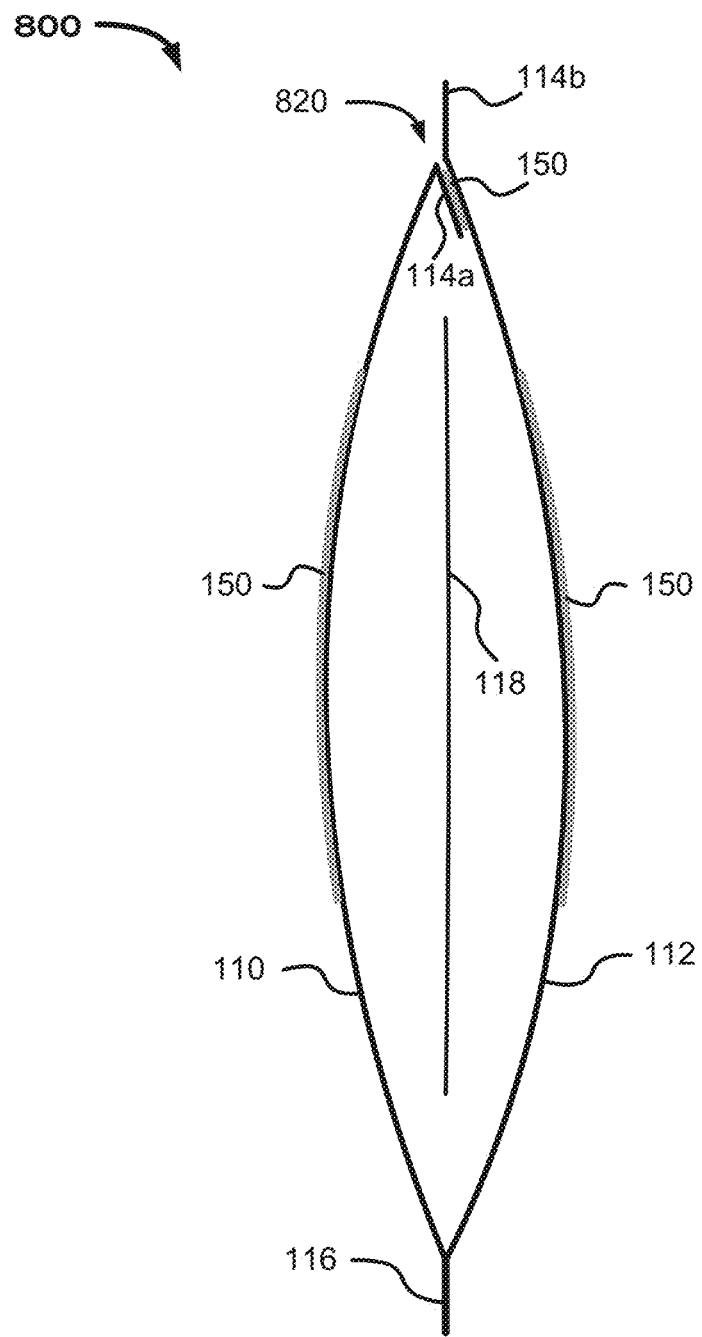

In another non-limiting example, as illustrated in FIG. 8D, the user may fold first surface 114a, associated with front panel 110, into opening 810 to cause patch 150, attached to first surface 114a, to make contact and/or bond with an interior surface of back panel 112. Causing patch 150 to make contact and/or bond with the interior surface of back panel 112 may create a temporary seal 820. Temporary seal 820 may enable package 800 to be temporarily closed and/or sealed to protect content, within package 800, from becoming spoiled and/or damaged. Temporary seal 820 may also, or alternatively, enable package 800 to be reopened without damaging, tearing, and/or destroying patch 150 and/or any portion of package 800 (e.g., front panel 110, back panel 112, top seal 114, bottom seal 116, side panel 118, etc.).

Similarly, although not shown in FIGS. 8A-8D, in the event that patch 150 is attached to second surface 114*b*, associated with back panel 112, the user may fold second surface 114*b* into opening 810 to cause patch 150 to make contact and/or bond with an interior surface of front panel 110. Causing patch 150 to make contact and/or bond with the interior surface of front panel 110 may create temporary seal 820 that enables package 800 to be temporarily reclosed and/or resealed.

Figure 8E:
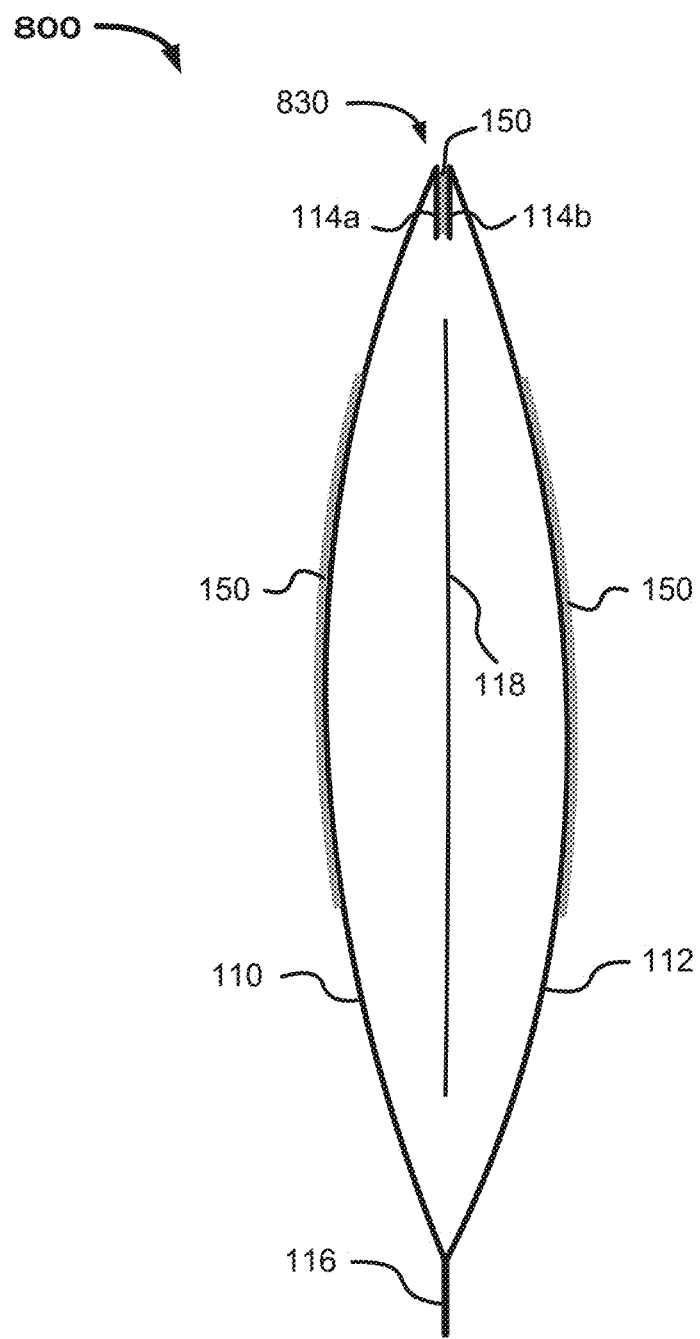

Additionally, or alternatively, as illustrated in FIG. 8E, the user may fold first surface 114*a* and second surface 114*b* into opening 810, and may cause patch 150 to make contact and/or bond with second surface 114*b*. Causing patch 150 to make contact and/or bond with second surface 114*b* may create temporary seal 830 that enables package 800 to be temporarily reclosed and/or resealed. Patch 150 may, alternatively, be attached to second surface 114*b* instead of first surface 114*a*. In this non-limiting example, the user may fold first surface 114*a* and second surface 114*b* into opening 810, and may cause patch 150 to make contact and/or bond with first surface 114*a*. Causing patch 150 to make contact and/or bond with first surface 114*a* may create temporary seal 830 that enables package 800 to be temporarily reclosed and/or resealed. Alternatively, a respective patch 150 may be attached to each of first service 114*a* and second surface 114*b*. In this non-limiting example, the user may fold first surface 114*a* and second surface 114*b* into opening 810, and may cause each respective patch 150 to make contact and/or bond with each other. Causing each respective patch 150 to make contact and/or bond with each other may create temporary seal 830 that enables package 800 to be temporarily reclosed and/or resealed.

As further shown in FIG. 7, process 700 may include re-opening the flexible package (BLOCK 725). For example, the user may grasp front panel 110 and back panel 112 and may pull front panel 110 apart from back panel 112, in generally opposite directions, to break temporary seal 820. Breaking temporary seal 820 may include breaking the bond, caused by patch 150, between first surface 114*a* and second surface 114*b* to enable first surface 114*a* and second surface 114*b* to become separated without damaging, tearing, and/or destroying patch 150 and/or any portion of package 800. Separating first surface 114*a* from second surface 114*b* may create opening 810, in package 800, via which content, stored within package 800, may be accessed and/or removed. Package 800 may be reclosed and/or resealed in the manner described above in process 700.

The order and timing of the steps of process 700, of FIG. 7, are not intended to be limiting and may be modified in other implementations. Additionally, or alternatively, non-dependent blocks of process 700 may be performed in parallel, and/or other steps, not-shown, may be included. For example, the steps of opening, activating and folding may be performed in a different order. Further, non-dependent blocks may be performed in parallel.

The foregoing description provides illustration and description, but is not intended to be exhaustive or to limit the implementations to the precise form disclosed. Modifications and variations are possible in light of the above disclosure or may be acquired from practice of the embodiments.

It will be apparent that the apparatus, systems, methods, technologies and/or techniques, as described above, may be implemented in many different forms of hardware and/or materials in the implementations described herein and illustrated in the figures. The actual or specialized hardware and/or materials used to implement these the apparatus, systems, methods, technologies and/or techniques is not limiting of the embodiments—it being understood that hardware and/or materials can be designed to implement the apparatus, systems, methods, technologies and/or techniques based on the description herein.

It should be emphasized that the terms "comprises"/"comprising" when used in this specification are taken to specify the presence of stated features, integers, steps or components but does not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" and "an" are intended to include one or more items and may be used interchangeably with "one" or "more." Where only one item is intended, the term "one" or similar language is used. Further, the phrase "based on" is intended to mean "based, at least in part, on" unless explicitly stated otherwise.

What is claimed is:

1. A flexible package comprising:
   a first panel and a second panel that are formed by a flexible material, the first panel being attached to the second panel to form an interior cavity, between the first panel and second panel, in which content is stored; and
   an activatable adhesive that is located on an exterior surface of the first panel or the second panel, the adhesive having an inactive state and an active state,
      wherein the inactive state precludes the adhesive from bonding with a separate portion of the first or second panel,
      wherein the active state is achieved by roughening, rubbing, heating, or scraping the adhesive and, when activated, enables the adhesive to bond with a separate portion of the first or second panel; and
   a seal between the first panel and the second panel which defines an openable access point for the package,
      wherein the activatable adhesive is disposed on an exterior of the first panel in the location of the seal, and
      wherein when the package is in a resealed position, the activated adhesive is releasably bonded to an interior surface of the second panel.

2. The flexible package of claim 1, where the adhesive comprises a pressure sensitive adhesive or a cohesive.

3. The flexible package of claim 2 wherein the adhesive is a cohesive, the flexible package comprises a plurality of locations of cohesive, and the locations of the cohesives are disposed to enable the cohesives to bond with each other.

4. The flexible package of claim 1, where the flexible material corresponds to a monoweb polymer.

5. The flexible package of claim 1, where the flexible material corresponds to a multiweb polymer.

6. The flexible package of claim 1 comprising a plurality of locations of activatable adhesive.

7. A method of resealing the flexible package of claim 1, the method comprising:
   opening the seal of the flexible package to access content stored within the flexible package;
   causing the adhesive disposed on the exterior of the first panel to change from the inactive state to an active state by roughening, rubbing, heating, or scraping the adhesive; and
   causing the adhesive, in the active state, to bond to an interior surface of the second panel to close the flexible package.

8. The method of claim 7, where heating the adhesive includes causing a temperature of the adhesive to increase to a threshold associated with the glass transition temperature of the adhesive.

* * * * *